(12) United States Patent
Steenwyk et al.

(10) Patent No.: US 6,682,061 B2
(45) Date of Patent: Jan. 27, 2004

(54) ACTUATOR SYSTEM FOR POSITIONING A WORKPIECE

(75) Inventors: Eric Steenwyk, Holland, MI (US); Brian L. Brinks, Holland, MI (US); Paul Brinks, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 167 days.

(21) Appl. No.: 10/046,067

(22) Filed: Jan. 14, 2002

(65) Prior Publication Data

US 2003/0132564 A1 Jul. 17, 2003

(51) Int. Cl.$^7$ ................................................. B25B 1/06
(52) U.S. Cl. ............................ 269/225; 269/61; 29/559
(58) Field of Search .......................... 269/225, 71, 289, 269/131, 61, 58; 29/559

(56) References Cited

U.S. PATENT DOCUMENTS

| | | | | | |
|---|---|---|---|---|---|
| 3,584,860 | A | * | 6/1971 | Ervin | 269/131 |
| 4,770,401 | A | * | 9/1988 | Donaldson | 269/249 |
| 5,887,860 | A | * | 3/1999 | Hong | 269/225 |

* cited by examiner

Primary Examiner—Lee D. Wilson
(74) Attorney, Agent, or Firm—Foley & Lardner

(57) ABSTRACT

An actuator system is disclosed for positioning a component interface relative to a work surface, including a first shaft coupled to the worksurface and a counterweight coupled to the first shaft, a second shaft coupled to the worksurface and the component interface coupled to the second shaft, a coupler communicating with the first shaft and the second shaft, a clutch mechanism in operable engagement with the second shaft; and a power source coupled to the second shaft for selectively applying a force to the second shaft when the clutch mechanism is engaged.

43 Claims, 5 Drawing Sheets

ACTUATOR SYSTEM FOR POSITIONING A WORKPIECE

FIELD OF THE INVENTION

The present invention relates to an actuator system for positioning a workpiece. More particularly, the present invention relates to a counterbalance actuator system for positioning a workpiece.

BACKGROUND

It is well known to provide for an actuator to mechanically move or position a workpiece, object or other component for installation on, or attachment to a product in assembly, production or work process activities. Such well known actuators are typically provided for reducing the amount of human effort expended in an assembly or production activity, or for improving the speed, accuracy, quality, repeatability or reliability of the operation. These well known actuators are commonly part of automated assembly or production systems, or may be manually operated or manually-assisted actuators operated by a user on assembly lines or other types of manufacturing or production stations operated by a user.

However, in such manually-assisted actuators that include heavy workpiece holders or involve moving and positioning heavy workpieces or objects it may be difficult for a user or operator to repetitively operate the actuator due to the fatigue involved with moving and positioning the weight of the object throughout the extended periods of time that are typically involved with a normal workshift. Such difficulty with manually-assisted actuators may also be compounded when the assembly or production activity requires the application of an assembly force by the user or operator to the workpiece after it has been positioned by the actuator, in order to install or attach the workpiece to a product or other item. Such known actuators have typically attempted to address this shortcoming by providing a counterweight positioned opposite the workpiece holder about a single pivot point to offset the rotational force required to move the workpiece or workpiece holder. The use of such offsetting counterweights coupled to the workpiece holder about a single pivot axis often involves a safety hazard associated with the counterweight moving in close proximity to the operator.

Accordingly, it would be advantageous to provide a manually-assisted actuator system for positioning or installing a workpiece on a product that includes a counterbalance system for offsetting the weight of the actuator and/or workpiece to reduce the operator fatigue associated with moving the actuator or workpiece. It would also be advantageous to provide a manually-assisted actuator system that has a spatially-compact counterbalance system that improves the available space around the assembly or production equipment and avoids the movement of a counterweight in close proximity to the operator. It would be further advantageous to provide a manually-assisted actuator system that provides an application or installation force to the workpiece only after the workpiece has been positioned relative to a product. It would be further advantageous to provide a manually-assisted actuator system that has a counterbalance system that is adjustable for adapting to workpieces or workpiece holders or having various weights. It would be further advantageous to provide a manually-assisted actuator system that has a structurally-robust design for construction simplicity, durability of operation and ease of repair.

Accordingly, it would be advantageous to provide a manually-assisted actuator system having any one or more of these or other advantageous systems.

SUMMARY OF THE INVENTION

The invention relates to an actuator system for positioning a component interface relative to a work surface, including a first shaft coupled to the worksurface and a counterweight coupled to the first shaft, a second shaft coupled to the worksurface and the component interface coupled to the second shaft, a coupler mechanically communicating with the first shaft and the second shaft, a clutch mechanism in operable engagement with the second shaft; and a power source coupled to the second shaft for selectively applying a force to the second shaft when the clutch mechanism is engaged.

The invention also relates to an actuator system for positioning a workpiece, including means for moving a component interface between a loading position and an installation position, means for counterbalancing the movement of the component interface between the loading position and the installation position, and means for applying a force on the workpiece when the component interface is in the installation position.

The invention further relates to an actuator system for receiving and positioning a component, including a drive member, a component interface coupled to the drive member for movement between a component loading position and a component installing position where the component interface is adapted to receive one or more components, a force applicator operatively engaging the drive member, a force generator coupled to the force applicator to selectively apply a force to the drive member, and a counterbalance mass operatively coupled to the drive member to substantially balance the mass of the component interface.

The invention further relates to a method for installing a workpiece on a worksurface including loading a workpiece in a holder capable of movement between a workpiece loading position and a workpiece installing position, moving the holder containing the workpiece from the loading position to the installing position, counterbalancing the movement of the holder between the loading position and the installing position, applying a force to the workpiece using a clutch device, and installing the workpiece on the worksurface.

DETAILED DESCRIPTION OF THE PREFERRED EMBODIMENTS

Figure 1:
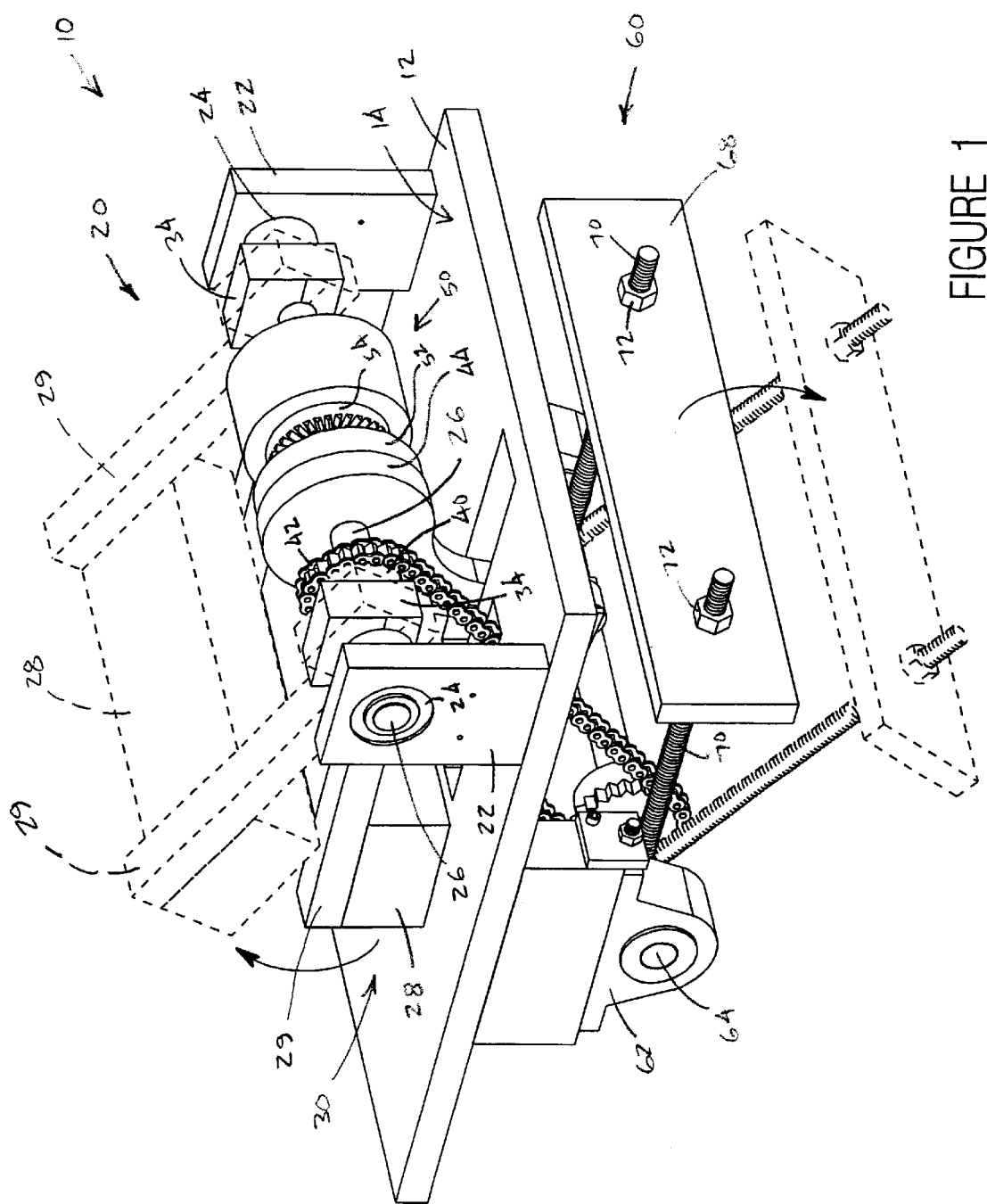
FIG. 1 is a top perspective view of a counterbalance actuator system according to an exemplary embodiment of the present invention.
Figure 2:
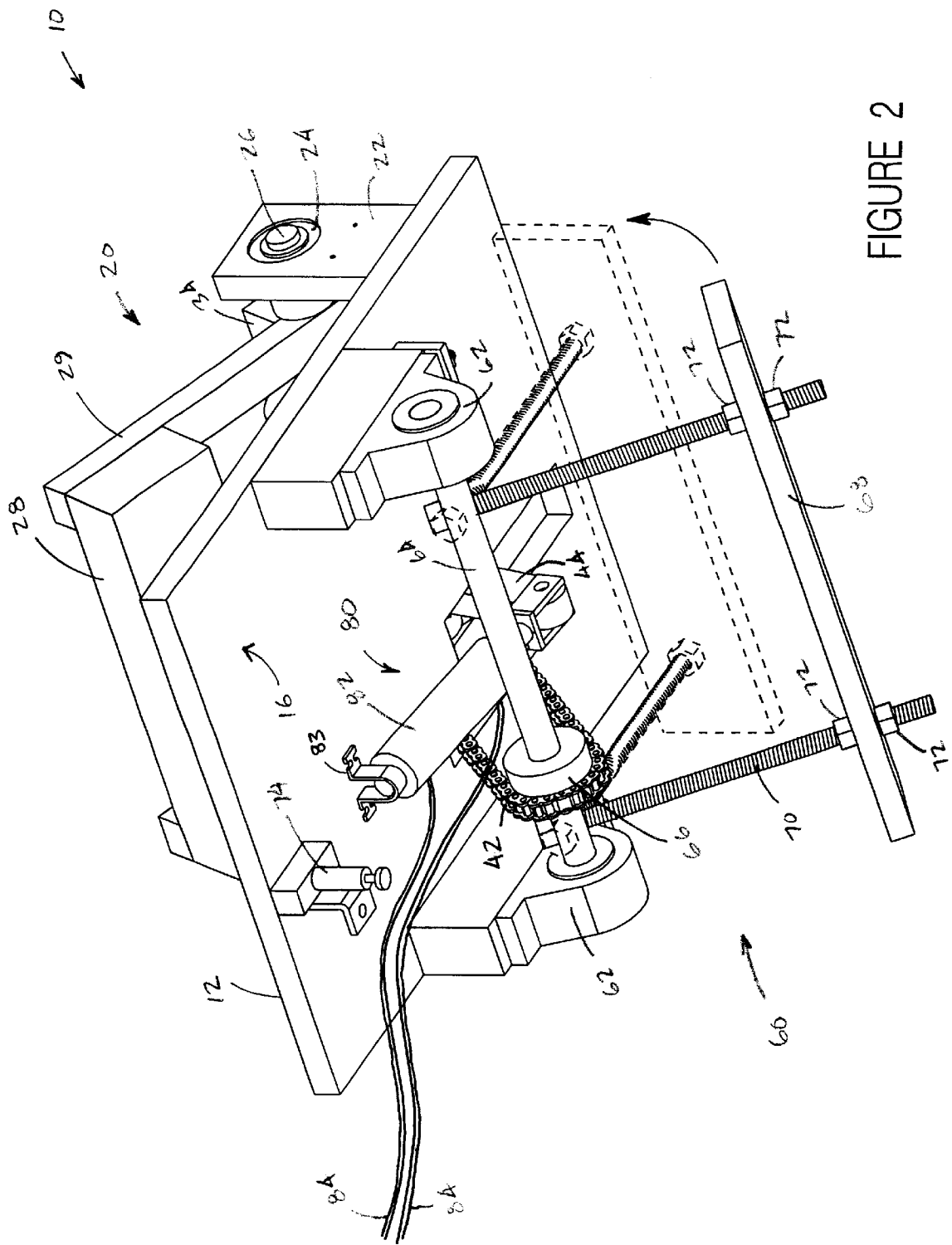
FIG. 2 is a bottom perspective view of a counterbalance actuator system according to an exemplary embodiment of the present invention.

Referring to FIGS. 1 and 2, an counterbalance actuator system 10 having an actuator portion 20, a counterbalance portion 60, and a force application portion 80 is shown according to an exemplary embodiment. Actuator system 10 is provided for the repetitive movement and positioning of a workpiece (such as an object, part, component, etc.) or other item adapted for installation on, or attachment to, another item, product or assembly or other surface adapted for receiving a workpiece or product. Actuator system 10 may include a base 12 (e.g. worksurface, platform, stand, etc.) shown as a generally flat plate but may be any suitable structure for adapting to a particular product assembly configuration. Base 12 may have a first side 14 and a second side 16 that generally separates the actuator system 10 into an actuator portion 20 as shown above base 12 and a counterbalance portion 60 as shown below base 12, however the elements and components of these portions to be described may be configured in any suitable position and relationship for performing the counterbalance actuating system function to be described. In an alternative embodiment, a base may be omitted and the elements and components of the system may be assembled for use directly with a product or other item for receiving a workpiece. In other alternative embodiments, the counterbalance portion may be provided in any convenient location to suit applicable workspace requirements.

Figure 4:
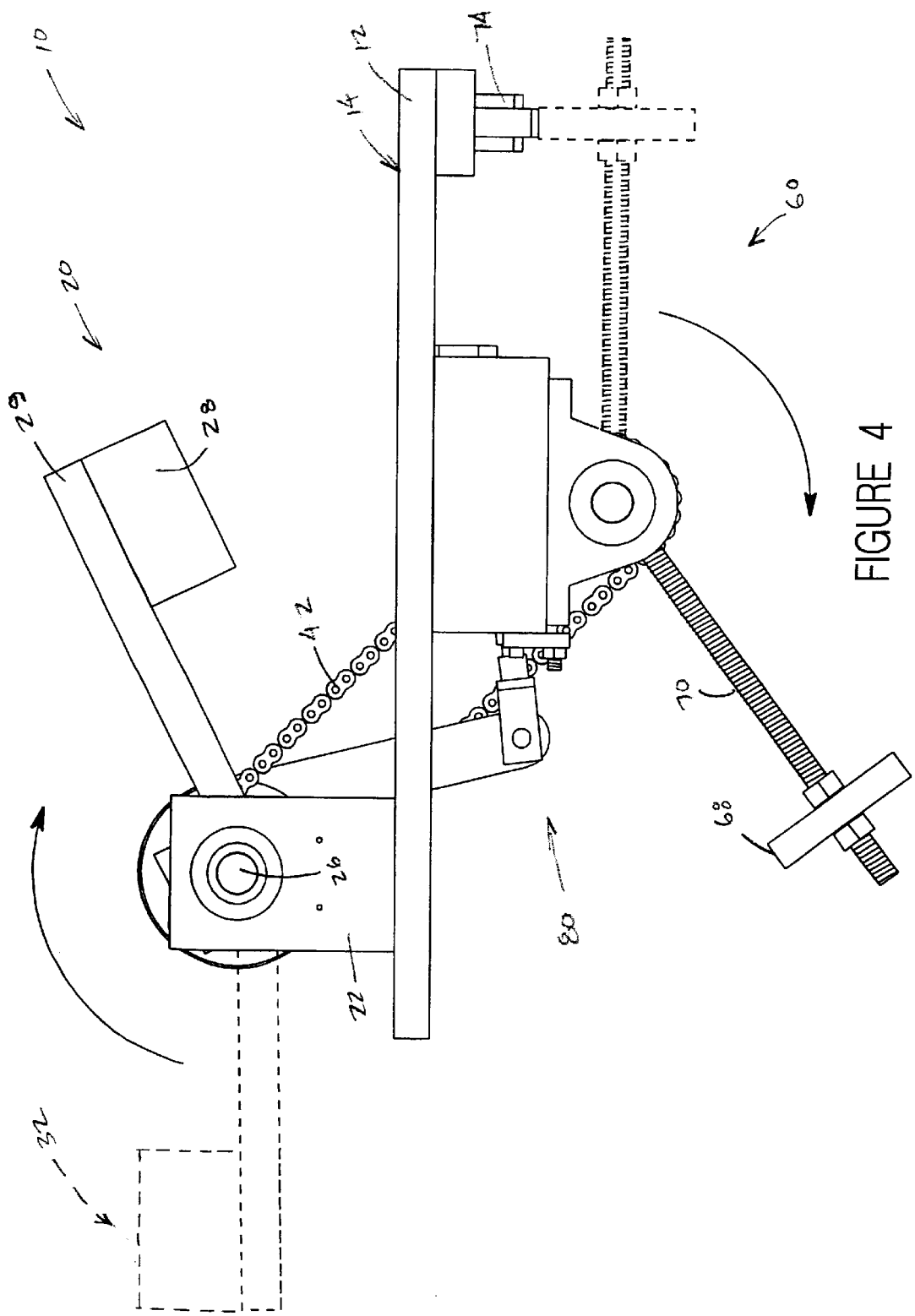
FIG. 4 is an second side view of a counterbalance actuator system according to an exemplary embodiment of the present invention.

Referring to FIG. 1, actuator portion 20 is shown according to an exemplary embodiment. Actuator portion 20 includes one or more bearing housings 22 (e.g. holders, supports, blocks, plates, etc.) mounted to base 12 by welding, threaded fasteners, unitary formation or other suitable method and are made of steel, aluminum or other suitable material for housing an anti-friction device shown as a roller bearing 24. In a particularly preferred embodiment, bearings 24 are an inner ring bearing such as part number ER-18T, manufactured by Sealmaster of Florence, Ky. or equivalent. Bearings 24 and bearing housings 22 are preferably positioned on base 12 in axial alignment for receiving the outboard ends of a shaft 26 oriented along a common axis with, and extending between, bearings 24. A component interface such as a workpiece holder 28 (shown schematically as a nest) is provided for receiving a workpiece. Workpiece holder 28 is coupled to shaft 26 by mounting arms 29 in a non-slip manner so that rotation of shaft 26 causes workpiece holder 28 to rotate between an installation position 30 (e.g. closed position the location of which may vary depending on the sizes and shapes of the workpiece and the item to which it may be joined) where the workpiece is positioned for attachment or installation on a product, and a loading position 32 (e.g. open position as shown in FIG. 4, the location of which may vary to accommodate the installation requirements for a particular workpiece) where the workpiece holder 28 is positioned for loading a new workpiece. In a particularly preferred embodiment, workpiece holder 28 has a shape configured to receive a particular component and is made of Renboard, but may be made from poured polyurethane, wood, metal, plastic, polymer or other materials suited for use in positioning a workpiece. In a preferred embodiment, actuator portion 20 may be manually operated by a user to move workpiece holder 28 between loading position 32 and installation position 30. Mounting arms 29 may be adjustably coupled to shaft 26 using clamps 34 or any other conventional fastening device. In alternative embodiments, workpiece holder 28 may have any suitable shape and size adapted for receiving and moving a workpiece.

A rotational drive device 40 such as a sprocket or pulley is coupled to shaft 26 in a non-slip manner such as by set screws, a shrink or interference fit, unitary formation, threaded onto shaft 26, or by any other suitable method and configured to engage a motion transfer member 42 (shown as a continuous chain, but could be a belt or other suitable transfer device). As workpiece holder 28 is moved by a user between loading position 32 and installation position 30, shaft 26 and rotational drive device 40 rotate about a common axis with bearings 24 and impart movement to motion transfer member 42. In a particularly preferred embodiment, rotational coupler 40 is a sprocket such as part number H40JA15-#40, manufactured by Tsubaki, Inc. of Wheeling, Ill. or equivalent, and motion transfer device 42 is a #40 roller chain manufactured by Tsubaki, Inc. of Wheeling, Ill. or equivalent.

Figure 5:
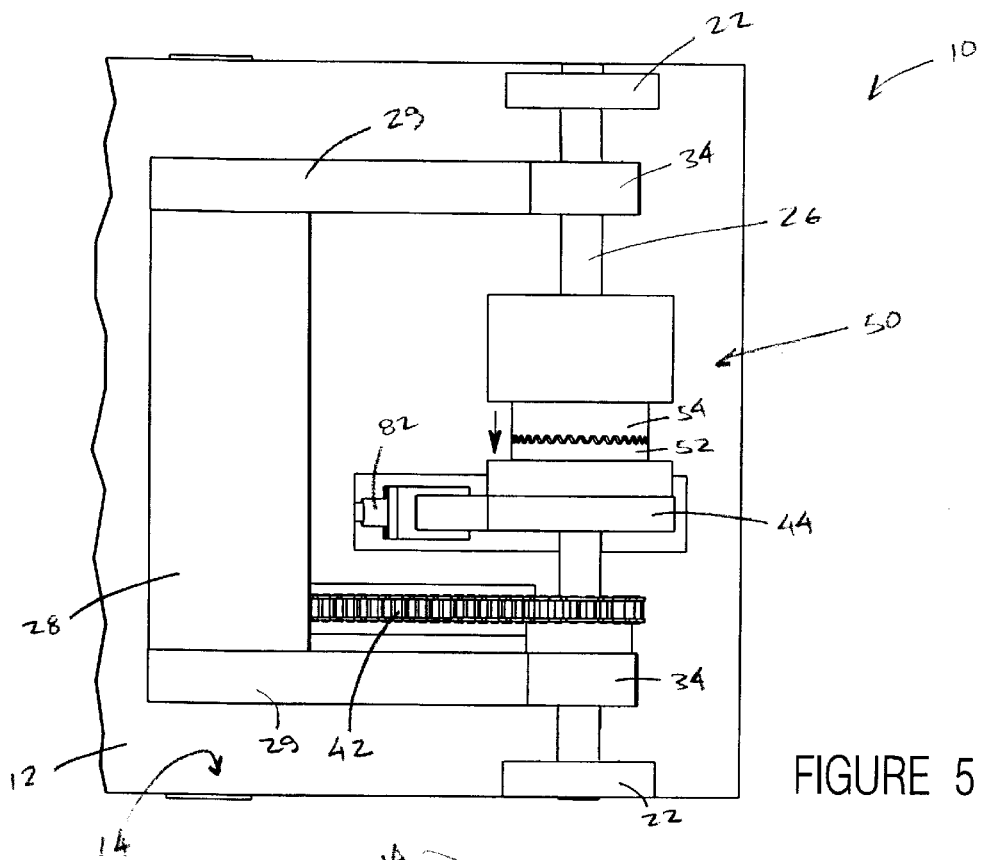
FIG. 5 is a top view of a counterbalance actuator system with a force transmission device in an engaged position according to an exemplary embodiment of the present invention.
Figure 6:
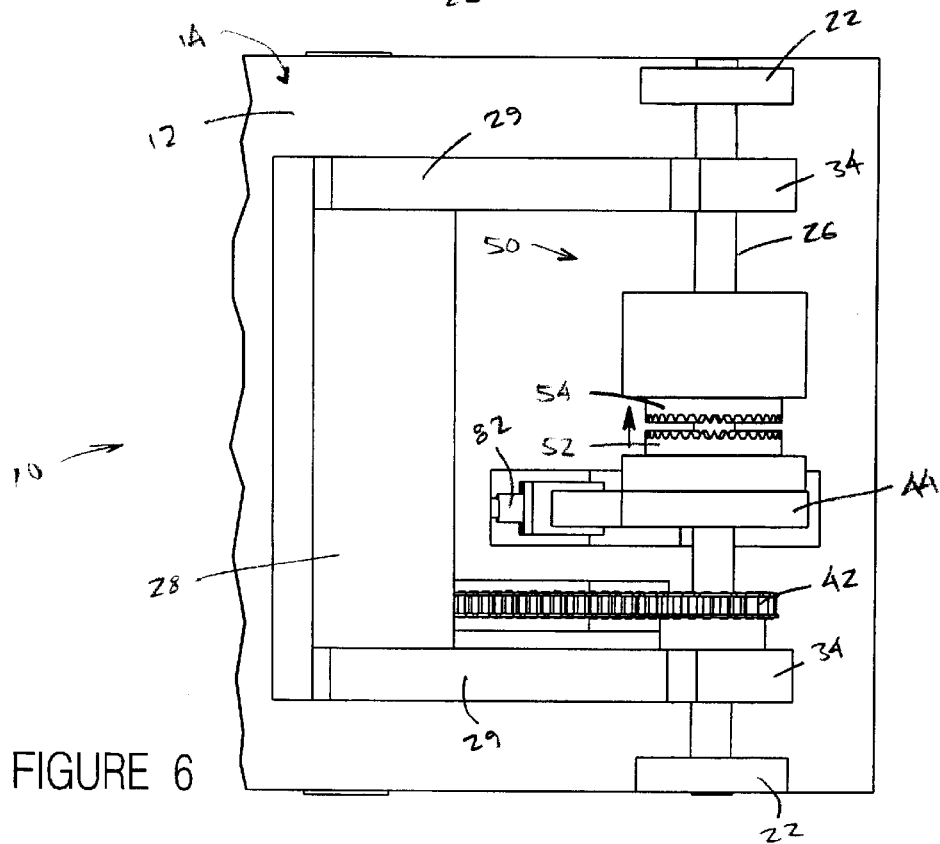
FIG. 6 is a top view of a counterbalance actuator system with a force transmission device in a disengaged position according to an exemplary embodiment of the present invention.

Shaft 26 also preferably includes a force transfer device 44 shown schematically as a torque arm or lever arm positioned in a rotatable relationship with shaft 26 so that the position of force transfer device 44 remains essentially constant while shaft 26 is free to rotate between the loading position 32 and the installation position 30. A selectively releasable engagement device, shown schematically as a clutch 50 has a first flange 52 fixed to force transfer device 44 in a rotatable relationship with shaft 26 so that the position of first flange 52 and force transfer device 44 remains essentially constant allowing shaft 26 to rotate freely between loading position 32 and installation position 30. As shown in FIGS. 5 and 6, a second flange 54 of clutch 50 is fixed to shaft 26 in facing alignment with first flange 52 so that when clutch 50 is actuated, second flange 54 shifts axially from a disengaged position to an engaged position to couple second flange 54 with first flange 52. In the engaged position first flange 52 and force transfer device 44 are rotationally coupled to shaft 26 via second flange 54. In operation, clutch 50 is disengaged when workpiece holder 28 is moved between the loading position 32 and the installation position 30. When workpiece holder 28 reaches installation position 30, the workpiece is positioned for attachment or installation on a product and clutch 50 is actuated. Actuation of clutch 50 locks second flange 54 to first flange 52 and force transfer device 44 so that a force may be applied to force transfer device 44 (as will be further described) and transmitted through shaft 26 to workpiece holder 28 for attachment or installation of a workpiece to a product. In a particularly preferred embodiment, clutch 50 is a flange-mount tooth-clutch model number 906806 manufactured by Nexen Group, Inc. of Vadnais Heights, Minn. or equivalent. Clutch 50 may be pneumatically (e.g. air or gas), hydraulically, electrically or mechanically actuated and may be provided with appropriate pneumatic or hydraulic lines, electrical conductors, or mechanical linkages (not shown).

Referring to FIG. 2, counterbalance portion 60 is shown according to an exemplary embodiment. In a preferred embodiment, counterbalance portion 60 is mounted to second side 16 of base 12 to provide a compact assembly and to conceal, shield and separate its operation from actuator portion 20 for improved safety and ease of operation by a user, however counterbalance portion 60 may be located in any convenient spatial relationship with actuator portion 20 to suit the particular needs of a desired application. Counterbalance portion 60 includes a set of anti-friction devices shown schematically as two bearings 62, coupled to lower side 18 of base 12 and providing freely-rotational support to a shaft 64. In a particularly preferred embodiment, bearings 62 are D-Lok type pillow block bearings part number 128704 manufactured by Dodge of Greenville, S.C., or equivalent, but may be any suitable anti-friction device such as bushings or roller bearings. Shaft 64 is preferably a bar made of steel, aluminum or other suitable material and having a circular cross section, although other materials and shapes may be used to suit a particular application.

Referring further to FIGS. 1 and 2, a rotational drive device or coupler 66 such as a sprocket or pulley is coupled to shaft 64 in a non-slip manner such as by set screws, a shrink or interference fit, unitary formation, threaded onto shaft 64, or by any other suitable method and configured to engage motion transfer member 42. In operation, rotation of shaft 26 will impart a corresponding rotation to shaft 64 via rotational drive devices 40, 66 and motion transfer device 42. The relative degree of rotation between shaft 26 and shaft 64 is dictated by the diameter ratio of rotational drive devices 40, 66. In a particularly preferred embodiment, the diameter ratio of rotational couplers 40, 66 is one to one (1:1), however other ratios may be used in alternative embodiments such as to gain mechanical advantage or provide varying rotational travel distances for an counterbalance weight.

Figure 3:
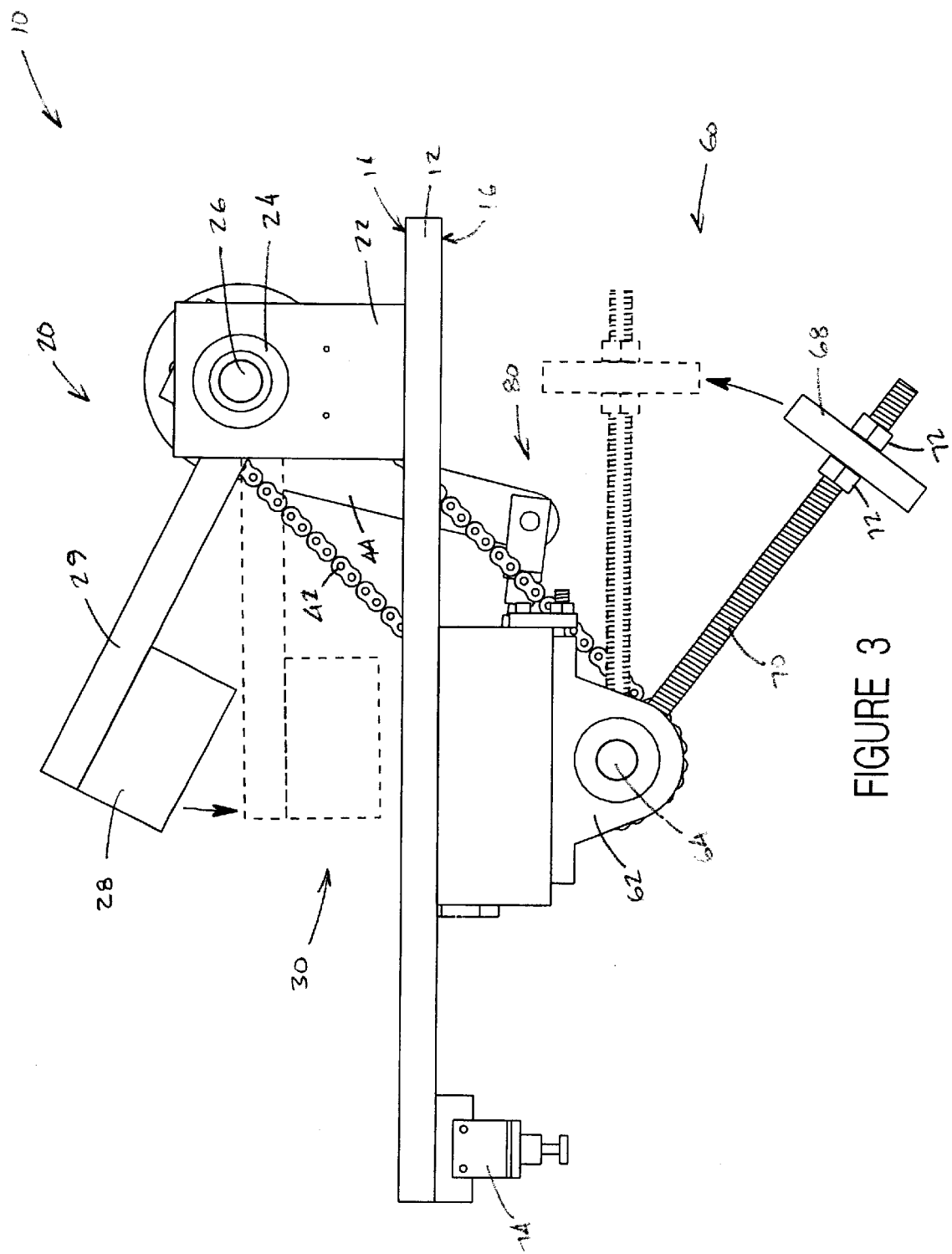
FIG. 3 is a first side view of a counterbalance actuator system according to an exemplary embodiment of the present invention.

Referring to FIGS. 2, 3 and 4 an adjustable counterbalance weight 68 is operably coupled to shaft 64 according to a preferred embodiment. In a particularly preferred embodiment, counterbalance portion 60 includes one or more adjustable extension devices, shown schematically as rods 70, coupled at a first end in a non-slip manner to shaft 64 and adapted to receive counterbalance weight 68 at any of a plurality of locations extending from the first end to the opposite end of rods 70. Weight 68 may be positioned along rods 70 at any appropriate position to create a moment that is generally equal and opposite to the moment created by workpiece holder 28 (and a workpiece if desired) extending from shaft 26. Rods 70 and weight 68 are rotated upward by shaft 64 when shaft 26 is rotated by downward movement of workpiece holder 28 and vice-versa so that the moment created by workpiece holder 28 and weight 68 are substantially offsetting. Weight 68 is selected having an appropriate mass to counterbalance workpiece holder 28 and may be selectively positioned along rods 70 to fine-tune the counter balance by suitable adjustment of retainers 72. In operation, as workpiece holder 28 is rotated between loading position 32 and installation position 30 and back to loading position 32, weight 68 is rotated in an opposing, balanced, and generally semi-circular relationship. In a particularly preferred embodiment, rods 70 are threaded rods and retainers 72 are hex nuts for threading onto rods 70 to clamp weight 68 in a desired position. In other alternative embodiments, the counterbalance portion may include non-threaded extensions members or weights that are integrally formed with a rotating shaft, and the weight and the extension members may be clamped, welded, pinned, interference fit, or joined in a sliding-detent manner. In further alternative embodiments, one or more extensions and weights may be used.

Referring further to FIGS. 2, 3 and 4 a positioner 74 (e.g. cushioning device, travel stop, bumper, shock absorber, etc.) may be provided and attached to second side 16 of base 12 to limit and cushion or dampen the impact from weight 68 as it reaches the end of its travel range when workpiece holder 28 is in loading position 32 (as shown in FIG. 4). In a particularly preferred embodiment, positioner 74 is an adjustable shock absorber, part number ACE-0225 manufactured by CE Controls, Inc. of Farmington Hills, Mich., or equivalent, but may be any suitable component such as a block of rubber or other resilient material for cushioning and limiting the range of travel of weight 68. In alternative embodiments, the positioner may be a hard-stop, a rotational interlock, or other device for limiting the travel of the counterbalance weight or workpiece holder to a desired position, and may be located to engage any portion of the system for limiting travel.

Referring to FIG. 3, a force application portion 80 of system 10 is shown according to an exemplary embodiment. Force application portion 80 may be actuated when workpiece holder 28 is moved to installation position 30 such that an installation or application force may be applied on workpiece holder 28 to assist with the installation or assembly of the workpiece to an item, product or other assembly object. A force generating device such as a power source 82, shown schematically as a piston-and-cylinder, is attached by one or more brackets 83 to second side 16 of base 12 and positioned so that the output of power source 82 is directed to a receiving portion end of force transfer device 44. When workpiece holder 28 has reached installation position 30 and clutch 50 is activated to rotationally couple force transfer device 44 to shaft 26, power source 82 is actuated for a predetermined period of time to apply a predetermined force to the workpiece via workpiece holder 28, shaft 26 and force transfer device 44. Pneumatic or hydraulic tubing associated with force generating device 82, shown schematically as lines 84, may be provided for controlling and operating the force actuation according to any conventional control and supply system. Electrical components such as switches, interlocks, timers, valves and controls (not shown) may also be provided to operate force application portion 80 according to any preferred embodiment. In a particularly preferred embodiment, force generating device 82 is an M class air cylinder, part number 1750D02-01A-03 manufactured by Numatics Actuator of Highland, Mich., or equivalent, operating on a conventional 80 pound per square inch compressed air supply to deliver a force corresponding to an installation pressure in the range of 1.5–3.0 pounds per square inch between the workpiece and the item to which the component is to be joined. A bonding agent such as adhesive or heat may be applied to the workpiece before or during the application of the force when workpiece holder 28 is in the installing position to improve the retention of the workpiece on the item to which the workpiece is joined. The force generated by power source 82 may be adjustable and may be applied for an adjustable period of time that is preferably automatically controlled by a programmable logic controller or timer (not shown), or other suitable device. In alternative embodiments, other operating pressures, or different force generating devices may be used such as hydraulic cylinders, spring actuators, linear actuators, motors or solenoid devices, and the duration of force application may be manually controlled.

According to other exemplary embodiments, the actuator system for positioning a workpiece may be associated with any application for the repetitive positioning of an object, including commercial, industrial and residential uses. The movement of the workpiece may also be adapted for linear movement or a combination of rotary and linear movement using suitable conventional linkage devices. It is important to note that the terms used to identify elements or components of the system are intended to be broad terms and not terms of limitation.

It is important to note that the construction and arrangement of the elements of the actuator system for positioning a workpiece as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, interchangeable relationships, use of materials, processes, orientations, etc.) without materially departing from the novel teachings and advantages of the subject matter recited in the claims. For example, the counterbalance portion of the system may be integrated onto a single shaft with the actuator portion and the force actuation portion may be integrated directly with the workpiece holder. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. An actuator system for positioning a component interface relative to a worksurface, comprising:
    a first shaft coupled to the worksurface;
    a counterweight coupled to the first shaft;
    a second shaft coupled to the worksurface;
    the component interface coupled to the second shaft;
    a coupler communicating with the first shaft and the second shaft;
    a clutch mechanism in operable engagement with the second shaft; and
    a power source coupled to the second shaft for selectively applying a force to the second shaft when the clutch mechanism is engaged.

2. The actuator system of claim 1, wherein the first shaft is rotatably coupled to a lower side of the worksurface.

3. The actuator system of claim 1, wherein the second shaft is rotatably coupled to an upper side of the worksurface.

4. The actuator system of claim 1, wherein the component interface is capable of rotation between an engaged position and a released position.

5. The actuator system of claim 1, wherein the component interface is interchangeable for holding a variety of workpieces.

6. The actuator system of claim 1, wherein the first shaft and the second shaft are rotatably coupled to the worksurface by a plurality of bearing assemblies.

7. The actuator system of claim 1, further comprising a force transfer device having a first end fixed to the second shaft and a second end coupled to the power source.

8. The actuator system of claim 1, wherein the power source is coupled to the worksurface.

9. The actuator system of claim 8, wherein the power source is a pneumatic cylinder.

10. The actuator system of claim 9, wherein the clutch mechanism is a pneumatically operated.

11. The actuator system of claim 10, wherein the clutch mechanism is a tooth clutch.

12. The actuator system of claim 11, wherein the pneumatic cylinder is capable of applying a predetermined force on the workpiece when the component interface is rotated to the engaged position and the clutch mechanism is pneumatically engaged.

13. The actuator system of claim 12, wherein the component interface can be freely rotated between the engaged position and the released position when the clutch mechanism is disengaged.

14. The actuator system of claim 1, further comprising a first rotational drive device fixed to the first shaft and a second rotational drive device fixed to the second shaft.

15. The actuator system of claim 14, wherein the first rotational drive device is a first sprocket, the second rotational drive device is a second sprocket and the coupler is a roller chain operably engaged with the first sprocket and the second sprocket.

16. The actuator system of claim 1, wherein the counterweight further comprises one or more adjustment mechanisms coupled to a mass.

17. The actuator system of claim 16, wherein the adjustment mechanisms are threaded rods.

18. The actuator system of claim 17, wherein the mass is adjustably coupled to the threaded rods for selectively adjusting the position of the mass relative to the first shaft.

19. The actuator system of claim 18, wherein the mass is positioned to counter balance the weight of the component interface.

20. An actuator system for positioning a workpiece, comprising:
    means for moving a component interface between a loading position and an installation position;
    means for counterbalancing the movement of the component interface between the loading position and the installation position; and
    means for applying a force on the workpiece when the component interface is in the installation position.

21. The actuator system of claim 20 wherein the means for applying a force includes a selectively engageable clutch mechanism.

22. The actuator system of claim 20 wherein the force is generated by a pneumatic piston device and the magnitude of the force is adjustable.

23. The actuator system of claim 20 wherein the means for counterbalancing is adjustable to accommodate different workpieces.

24. The actuator system of claim 20 further comprising means for limiting the movement of the component interface between the loading position and the installation position.

25. An actuator system for receiving and positioning a component, comprising:
    a drive member;
    a component interface coupled to the drive member for movement between a component loading position and a component installing position, the component interface adapted to receive one or more components;
    a force applicator operatively engaging the drive member;
    a force generator coupled to the force applicator to selectively apply a force to the drive member;
    at least one counterbalance device operatively coupled to the drive member to substantially balance the component interface.

26. The actuator system of claim 25 wherein the force applicator releasably engages the drive member through a clutch mechanism.

27. The actuator system of claim 26 wherein the component interface is interchangeable to accommodate one or more components having different sizes.

28. The actuator system of claim 25 wherein the drive member and the component interface are coupled for rotational movement.

29. The actuator system of claim 25 wherein the drive member is a shaft.

30. The actuator system of claim 29 wherein the shaft is supported for rotational movement by one or more bearings.

31. The actuator system of claim 25 wherein counterbalance device is adjustable.

32. The actuator system of claim 25 wherein the force generator is a pneumatic piston device.

33. The actuator system of claim 25 further comprising a travel stop for limiting the range of movement by the component interface.

34. The actuator system of claim 25 wherein the force generator operatively applies a force having a predetermined magnitude between the component and a worksurface for a predetermined time period.

35. A method for installing a workpiece on a worksurface, comprising:
  loading a workpiece in a holder, the holder capable of movement between a workpiece loading position and a workpiece installing position;
  moving the holder containing the workpiece from the loading position to the installing position;
  counterbalancing the movement of the holder between the loading position and the installing position;
  applying a force to the workpiece using a clutch device; and installing the workpiece on the worksurface.

36. The method of claim 35 further comprising the step of limiting the movement of the holder at the loading position.

37. The method of claim 35 further comprising the step of applying an adhesive to the workpiece when the holder is in the loading position.

38. The method of claim 35 wherein the force is applied for a predetermined magnitude and a predetermined period of time on the workpiece when the workpiece is in the installing position.

39. The method of claim 35 further comprising the step of returning the holder to the loading position.

40. A component positioning device, comprising:
  a component interface movable between a receiving position and an installing position,
  at least one counterbalance weight operably engaging the component interface, and
  an engagement device selectively operable between an engaged position and a released position;
  a force applicator for selectively applying a force to the component interface when the component interface is in the installing position and the engagement device is in the engaged position.

41. The component positioning device of claim 40 wherein the counterbalance weight is adjustable.

42. The component positioning device of claim 40 wherein the force application is a pneumatic cylinder for providing a predetermined force for a predetermined time.

43. The component positioning device of claim 40 wherein the component interface is interchangeable to adapt the device for use with a plurality of workpieces having different shapes or sizes.

* * * * *